United States Patent [19]

van der Burgt

[11] 4,120,410
[45] Oct. 17, 1978

[54] APPARATUS FOR THE SUPPLY OF FUEL POWDER TO A GAS-PRESSURIZED VESSEL

[75] Inventor: Maarten J. van der Burgt, The Hague, Netherlands

[73] Assignee: Shell Internationale Research Maatschappij B.V., The Hague, Netherlands

[21] Appl. No.: 819,366

[22] Filed: Jul. 27, 1977

[30] Foreign Application Priority Data

Sep. 13, 1976 [NL] Netherlands ................... 7610130

[51] Int. Cl.² ............................................. B65G 65/30
[52] U.S. Cl. ............................. 214/17 B; 214/17 CB
[58] Field of Search ............. 214/17 B, 17 CB, 18 R, 214/21; 48/86 R; 198/642

[56] References Cited

U.S. PATENT DOCUMENTS

| | | | |
|---|---|---|---|
| 2,495,152 | 1/1950 | Voorhees | 214/17 CB X |
| 2,920,793 | 1/1960 | Munsell | 214/17 CB X |
| 3,182,825 | 5/1965 | Zellerhoff | 214/17 CB |
| 4,034,870 | 7/1977 | Duch | 214/17 CB |

FOREIGN PATENT DOCUMENTS 234,738  1/1925  United Kingdom ............... 214/17 CB

*Primary Examiner*—Robert G. Sheridan
*Attorney, Agent, or Firm*—Pravel, Wilson & Gambrell

[57] ABSTRACT

An apparatus and method for the supply of pressurized fuel powder to a pressurized reactor, comprising the steps of, and apparatus for, supplying powder to a vessel with a centrifugal pump to inject powder into the vessel by centrifugal force, and maintaining a supply of powder from outside the vessel to the pump.

5 Claims, 1 Drawing Figure

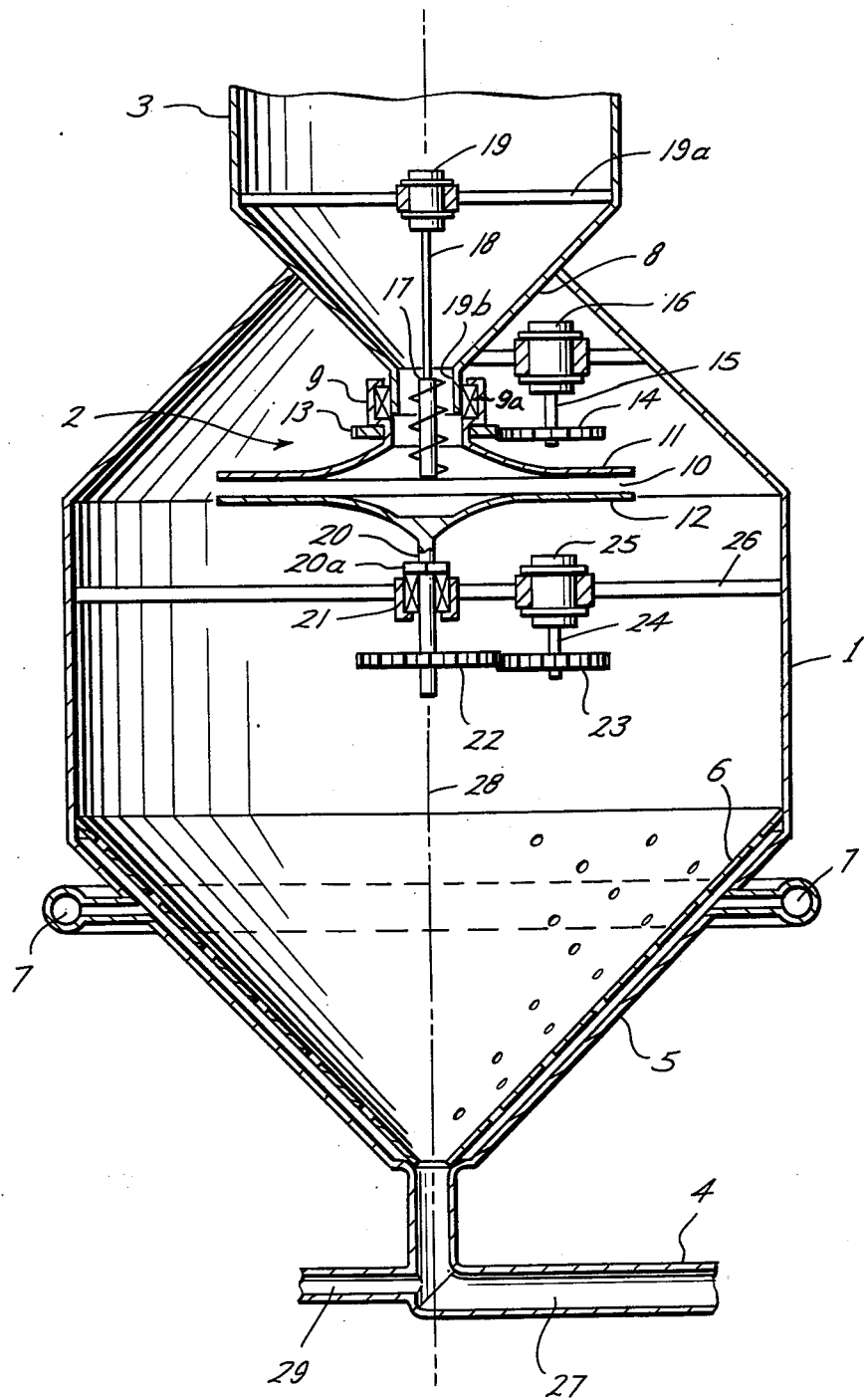

APPARATUS FOR THE SUPPLY OF FUEL POWDER TO A GAS-PRESSURIZED VESSEL

BACKGROUND OF THE INVENTION

1. Field of the Invention

The field of this invention is apparatus and methods for providing pressurized pulverized solid fuel to a reactor.

2. Description of the Prior Art

In supplying pulverized solid fuel, such as lignite or hard coal, to a high-pressure coal gasification reactor, the gas pressure in the reactor, which is generally at least 10 atmospheres absolute (atm. abs.), has to be overcome. Another problem connected with this supply is the high temperature of the reactor wall. In order to solve these problems, it has been suggested heretofore that the pressurizing of the coal powder be separated from its introduction into the reactor. In this way the coal powder is pressurized in a vessel and subsequently passed from the vessel to the reactor. The pressure in the vessel will be at least equal to the reactor pressure. As a rule, the coal powder is mixed with the air or oxygen required for the gasification before the powder enters the reactor. In view of the relatively long residence time of the coal powder in the mixing vessel, an explosion hazard is created under such conditions, so the mixing is usually effected in the reactor or burner. The solid fuel is fed by a dosing or feeding apparatus which may be, for example, a screw conveyor which debouches or discharges the solid fuel into the burner of the reactor, into which air or other oxygen-containing material is also fed through a separate line. However, other designs are equally possible; for example those in which the coal particles are fluidized in the vessel and in which the coal particles are withdrawn from the vessel as a fluidized stream and supplied to a burner, with the required air or oxygen.

The vessel is usually pressurized with a gas which is inert to fuel powder, i.e. which contains little or no oxygen, and which usually has a low or relatively low temperature in comparison with the temperatures in the gasification reactor. Suitable gases for this purpose are, for example, nitrogen, carbon dioxide, hydrogen, carbon monoxide, gaseous hydrocarbons and steam. Mixtures of these gases, with each other and/or with other gases, may also be used; as well as gas that has been obtained by the coal gasification and cooled. This inert gas is introduced into the vessel by another route than the powder. Preferably, the powder in such a vessel is in a more or less fluidized state.

Other processes than the above-mentioned coal gasification process also utilize an intermediate vessel in which fuel powder resides for some time in a gas-pressurized state.

In U.S. Pat. No. 3,182,825, an apparatus is disclosed wherein a rotor having centrifugal nozzles tapering outwards and arranged radially relative to its axis of rotation is used to inject powder into a vessel. A disadvantage of such nozzles is that they are liable to blockage by bridging—i.e. local compaction—of the powder flowing through. In that case there are few if any possibilities of removing these blockages during operation.

SUMMARY OF THE INVENTION

This invention relates to an apparatus and method wherein pulverized or powdered solid fuel is intimately mixed with an inert gas in a mixing vessel so that the pressurized fuel can be fed to a gasification reactor at a pressure substantially equal to the pressure in a gasification reactor, and wherein the pressurizing of the fuel is effected in the mixing vessel by discharging solid pulverized fuel into the vessel with a centrifugal force from a supply inlet to the vessel at a higher pressure to overcome the gas pressure in the vessel. At the same time, fuel is continually supplied to the inlet opening to the vessel to avoid a pressure increase at such inlet.

BRIEF DESCRIPTION OF THE DRAWING

The invention will now be further elucidated with reference to the appended drawing, which is a vertical cross-sectional view of an embodiment of the apparatus according to the invention.

DESCRIPTION OF THE PREFERRED EMBODIMENT

The drawing shows a vessel 1 in which a centrifugal pump 2 is located with which coal powder is passed into the vessel 1 from a hopper 3. The vessel 1 debouches into a discharge line 4, which leads to a gasification reactor (not shown). To this end the bottom 5 of the vessel 1 is funnel-shaped. This funnel-shaped bottom 5 is provided with a porous inner wall 6 through which gas is supplied for the fluidization of the coal powder in vessel 1 and for the pressurizing of the vessel 1. The gas supply is located at 7.

The bottom 8 of the hopper 3 is funnel-shaped and extends downwardly into the bore of supply tube 9 supported rotatably therewith by a suitable means such as a bearing 9a, which tube forms the connection between the hopper 3 and the annular slit 10 between the opposed faces of the disk-shaped or circular trays 11 and 12. The supply tube 9 is integral with the upper tray 11 and is provided with an external toothed wheel or gear 13 which meshes with gear wheel 14 secured to the shaft 15 of an electromotor 16. A rotatable worm conveyor 17 extending from the hopper 3 into the bore of the supply tube 9, is supported on shaft 18 which is driven by an electromotor 19 mounted on a spider 19a. The spider 19a preferably is a series of arcuately spaced spokes or rods which are welded or otherwise secured to the inside of the hopper 3, and with openings therebetween so that solids can pass through the spider 19a.

The lower tray 12 is formed integrally with or is otherwise supported on a shaft 20 in a suitable bearing 21 for rotation about the central axis 28 of the vessel 1. On the shaft 20 there is a gear wheel 22 which meshes with a gear wheel 23 on the shaft 24 of an electromotor 25. The bearing 21 and the electromotor are secured in the vessel 1 by means of a spider 26 made up of two or more rods or spokes which are welded or otherwise secured from one side of the vessel 1 to the bearing 21 in a manner similar to the spider 19a. The drive mechanisms are protected with suitable shields or covers (not shown) to keep the solids from interfering with the operation thereof. Also, it will be understood that the motors are connected to an electrical power source by conventional means.

The funnel-shaped bottom 5 of the vessel 1 debouches into an ejector tube 27 of a discharge line 4. A line 29 which extends at a right angle to the central axis 28 debouches into the tube 27 and line 4.

Thus, by means of centrifugal pump 2, the powder is introduced into the vessel 1 against the high gas pressure in the mixing vessel 1. Gas is also present in the various parts of the centrifugal pump through which the powder flows. The gas pressure in the supply tube 9 will differ relatively little from the gas pressure in the powder-filled area 19b with which the supply tube 9 communicates to the outside of the vessel 1.

The high gas pressure, usually above ten atmospheres absolute, prevails in the vessel 1 in the area externally of the centrifugal pump 2, and there is a considerably lower gas pressure in the supply tube 9 where it debouches into the area between the rotor trays 11 and 12. There is consequently a considerable drop in gas pressure across the rotor in the direction opposite to the flow of the powder. Such pressure difference is overcome by imparting centrifugal force to the flowing fuel particles. Accordingly, each value of the pressure difference requires a corresponding minimum speed of the rotor of the centrifugal pump for the ejection of the particles. In fact, at any point in the rotor the centrifugal force acting on the particles (compensated for frictional losses) must be larger than the forces acting on the particles as a result of the gas pressure in the vessel 1. Also, the larger the total difference between the gas pressure in the vessel 1 and the pressure at the tube 9 which is to be overcome, the larger the diameter of the rotor has to be and/or the faster it has to rotate in order to be able to provide the required centrifugal force.

As will be evident from the foregoing description, the invention utilizes two trays such as trays 11, 12 positioned at right angles to the supply tube such as tube 9, between which trays there is the slit or annular opening 10 which forms the connection between the vessel 1 and the supply tube 9. The trays are thus located at the end of the supply tube, which latter deposits the powder in the center of the trays. From this central place the powder is then moved outwardly by centrifugal force in all directions and leaves the rotor at the end of the slit, i.e. at the periphery of the trays, with a high velocity.

The probability of blockages is reduced particularly because in the event of incipient bridging in the slit there will usually be a stream of powder nearby which will tend to destroy the bridge.

Another advantage of the omnidirectional slit according to the invention as compared with the prior art nozzles is that the width of the slit can be set arbitrarily and in a simple manner, while the fixed geometry and dimensions of a nozzle permit no tolerance. This may be important in the event of a change in the type of fuel or the particle size or in the case of a change in the desired throughput.

Although in principle the slit may be located between two flat, disk-shaped trays, according to the invention a slit which tapers outwardly is preferably used. This is achieved by means of trays having opposing faces which are of arching shape as shown in the drawing.

Since the centrifugal force must be generated by the effect which the tray wall has on the particles, this outward tapering is beneficial.

The supply tube 9 is filled from outside the pressurized vessel. There the pressure is considerably lower than in the pressurized vessel and will not differ greatly from the pressure in the supply tube. As explained, the pressure difference between the entry and the edge of the rotor must be overcome. If at a certain moment during operation the area between the trays 11 and 12 forming the rotor should become empty, for example because the discharge proceeds more rapidly than the supply, an undesirable rise in the pressure in the supply tube would occur.

In order to obviate such occurrence, the supply tube 9 is constantly filled with the pulverized solids, preferably by controlling the supply of powder thereto with mechanical means for passing fuel powder through the supply tube, such as the worm conveyor 17. This assures a continuous supply of powder to the rotor of the centrifugal pump.

The rotor drive mechanism, which includes the two variable speed motors 16 and 25, is preferably designed to rotate the trays 11 and 12 with a small difference in speed. Advantageously this difference in speed is less than 10%. This prevents any incipient bridge formation of solids and consequent blockage in the rotor.

As an alternative to the smooth internal opposing faces of the trays 11, 12, at least one of the trays may have a profile or surface configuration on its face at the outer annular edge thereof. Such modified structure results in increased friction between the tray and the stream of particles, causing the centrifugal force of the rotor to be increased, thereby allowing a larger pressure difference between the inlet to and outlet from the rotor to be overcome. The profile or surface configuration may be made, for example, in the shape of grooves in the internal tray surface or raised ribs, or the like.

The tray faces may also be profiled so that the slit is segmented, i.e. divided into compartments.

As explained, according to the invention there is a pressure difference across the rotor during operation of the centrifugal pump. In the case of the use of the apparatus or method of this invention for feeding pressurized powdered solid fuel to a reactor for coal gasification, such pressure in the vessel 1 should be substantially equal to the pressure in the gasification reactor (not shown). The pressure difference across the rotor is determined by the velocity and density of the particles in the rotor and both of the latter factors depend, inter alia, on the influence of the adjacent tray wall. It may be important, for example in connection with the operation of the gasification reactor, to control the pressure in the vessel 1. For precise control of the pressure, the controllability of the pressure drop across the rotor plays a role. This controllability can be increased according to the invention by making the distance between the trays 11, 12 controllable.

According to one embodiment of the apparatus of the invention, adjusting means, such as a movable stop clamp 20a on shaft 20 is provided, to alter the width of the slit between the trays and/or to alter the speed of the rotor. Thus, assuming the shaft 20 is to be moved up or down from the position shown in the drawings, the stop clamp 20a is released, the shaft 20 and the tray 12 therewith are moved vertically to the new position, and the clamp 20a is re-attached to the shaft 20. It will be appreciated that other suitable means may be used instead of the clamp 20a. In this way a controllable centrifugal pump is obtained. The trays are preferably rotated with a small difference in speed so that there is a small relative movement therebetween. The average speed of the entire rotor can be altered while still obtaining such differential in speed between the trays 11, 12.

The operation of the apparatus is as follows:

Coal powder is maintained at a certain level in the funnel 8 of the hopper 3 and is fed downwardly therefrom, usually continuously, by means of the worm conveyor 17 through the supply tube 9 to the slit 10. The powder is injected into the vessel 1 in between the two rapidly rotating trays 11 and 12. In the vessel 1, which is under a relatively high pressure, the coal powder is kept in a somewhat fluidized state by means of gas flowing through the porous wall 6 into the vessel 1.

Coal powder is continuously discharged via the line 4 from the funnel shaped bottom of vessel 1, the coal powder flow being supported by a high-speed gas stream which is blown into the ejector tube 27 via the line 29.

The throughput is controlled by the speed of the worm conveyor 17 and the speed of the circular trays 11 and 12, as well as by the distance between the trays.

The fuel from line 4 is preferably supplied to a conventional high-pressure coal gasification reactor via a conventional dosing or quantity-control apparatus (not shown).

The invention also relates to a process for the supply of fuel powder to a gas-pressurized vessel, the powder being passed from outside the vessel, via a supply tube to a rotating rotor installed in the vessel, which rotor injects the powder into the vessel by centrifugal force, the axis of rotation of the rotor coinciding with the center line of the supply tube.

In the process according to the invention it is further possible to alter the quantity of powder introduced into the vessel by altering the width of the slit between the trays and/or by altering the speed of the rotor.

The foregoing disclosure and description of the invention are illustrative and explanatory thereof, and various changes in the size, shape and materials as well as in the details of the illustrated construction may be made without departing from the spirit of the invention.

I claim:

1. An apparatus for the supply of fuel powder to a gas-pressurized vessel, comprising:
   a centrifugal pump for supplying powder to the vessel;
   means for mounting said centrifugal pump in the vessel for injecting powder into the vessel by centrifugal force;
   a supply tube for the supply of powder from outside of the vessel to the centrifugal pump;
   the axis of rotation of the centrifugal pump coinciding with the center line of the supply tube;
   said pump comprising two rotatably mounted trays positioned in said vessel and having a discharge slit in the area between said trays;
   said supply tube being in communication with area between said trays for flowing the powder from the supply tube outwardly through said slit into said vessel as said trays are rotated in said vessel; and
   means to rotate the trays in the same direction at a small relatively different speed.

2. The apparatus set forth in claim 1, wherein:
   the relative difference in the speed of rotation of the two is less than 10%.

3. The apparatus set forth in claim 1, wherein:
   at least one of the trays is provided with a profile at the outer portion thereof in proximity of said slit.

4. The apparatus set forth in claim 1, including:
   means to alter the width of the slit.

5. The apparatus set forth in claim 1, including:
   means to alter the speed of rotation of said trays.

* * * * *